United States Patent [19]

Krey

[11] Patent Number: 4,733,334

[45] Date of Patent: Mar. 22, 1988

[54] HEADLIGHT LEVELING DEVICE

[76] Inventor: Michael F. Krey, 11 Peninsula Rd., White Bear Lake, Minn. 55110

[21] Appl. No.: 36,585

[22] Filed: Apr. 10, 1987

[51] Int. Cl.⁴ .............................................. B60Q 1/10
[52] U.S. Cl. ...................................................... 362/71
[58] Field of Search .......................... 362/66, 71, 250; 33/337, 376

[56] References Cited

U.S. PATENT DOCUMENTS

| | | |
|---|---|---|
| 1,819,690 | 8/1931 | Ricker . |
| 3,596,837 | 8/1971 | Todd et al. . |
| 3,629,570 | 12/1971 | Bouthors et al. ...................... 362/71 |
| 3,634,677 | 1/1972 | Wolffling-Seelig et al. . |
| 3,700,878 | 10/1972 | Baker . |
| 3,728,538 | 4/1973 | Bailly ...................................... 362/71 |
| 3,808,417 | 4/1974 | Martin ..................................... 362/71 |
| 3,925,656 | 12/1975 | Andres et al. . |
| 3,973,114 | 8/1976 | Martin ..................................... 362/71 |
| 4,027,149 | 5/1977 | Martin . |
| 4,052,609 | 10/1977 | Martin . |
| 4,162,424 | 7/1979 | Zillgitt et al. .......................... 362/71 |
| 4,194,235 | 3/1980 | Heinlein ................................. 362/71 |
| 4,204,270 | 5/1980 | Poirier d'Ange d'Orsay ....... 362/71 |
| 4,225,902 | 9/1980 | Iskikawa et al. . |
| 4,276,581 | 6/1981 | Orii et al. . |
| 4,336,572 | 6/1982 | Takata . |

FOREIGN PATENT DOCUMENTS

| | | |
|---|---|---|
| 3334033 | 4/1985 | Fed. Rep. of Germany ........ 362/71 |
| 0060047 | 4/1985 | Japan ..................................... 362/71 |

*Primary Examiner*—Charles J. Myhre
*Assistant Examiner*—David A. Okonsky
*Attorney, Agent, or Firm*—Merchant, Gould, Smith, Edell, Welter & Schmidt

[57] ABSTRACT

A vehicle headlight leveling system provides for selected adjustment of headlight alignment, in response to varying loads placed in a vehicle body riding upon a vehicle suspension system. This system utilizes a ground level detection mechanism, a headlight level detection mechanism and an adjustment mechanism for the headlight aiming. For the preferred embodiment, the ground level and headlight level are indicated upon display means positioned appropriately for the driver of the vehicle. The adjustment mechanism can be manipulated, as necessary, to achieve a desired relationship between headlight alignment and the ground plane.

7 Claims, 5 Drawing Figures

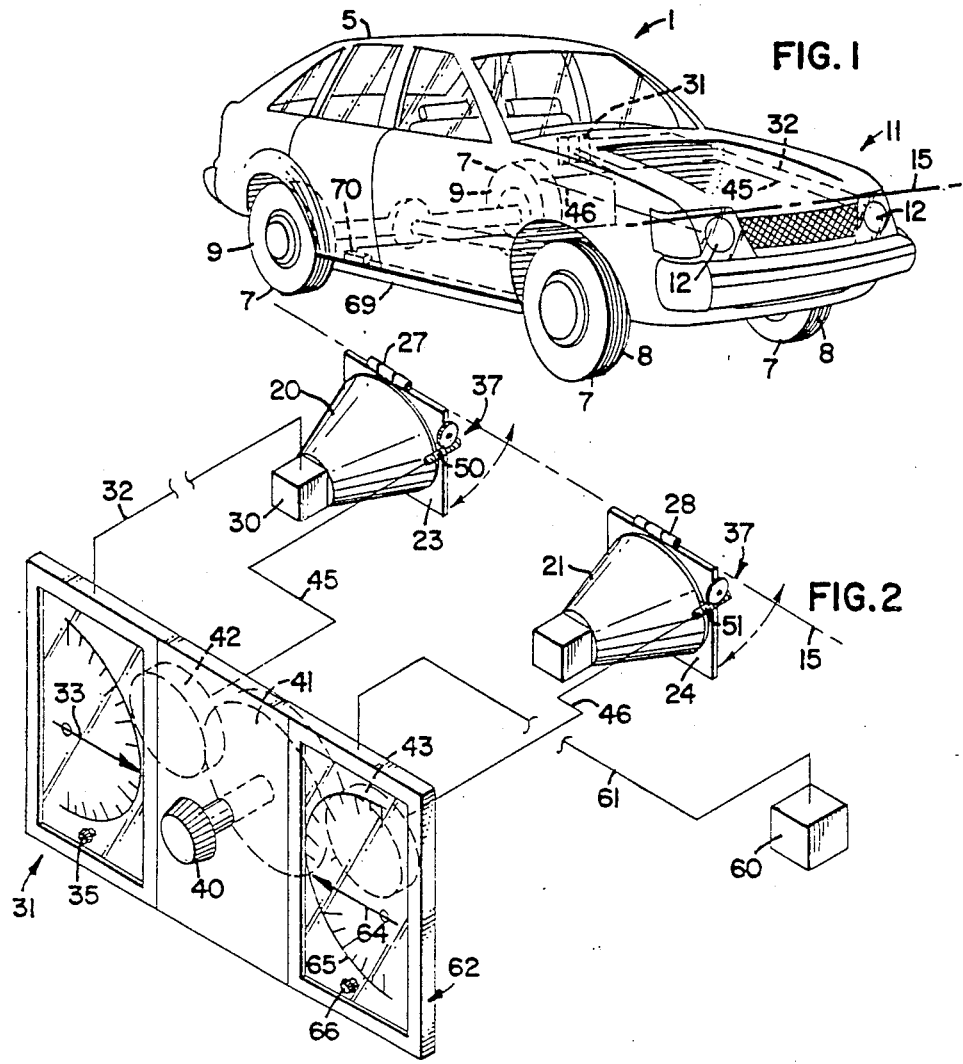
FIG. 1
FIG. 2
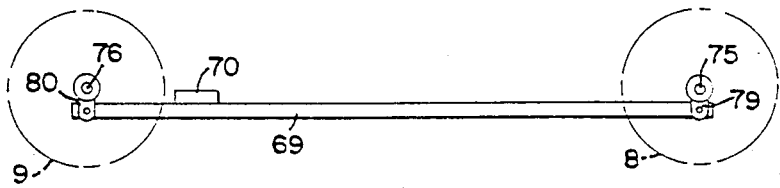
FIG. 3

HEADLIGHT LEVELING DEVICE

FIELD OF THE INVENTION

The present invention relates to automotive vehicles such as cars, trucks, busses and the like. In particular, the invention relates to headlight systems for such vehicles, and means for adjusting headlight alignment in response to vehicle body reorientations under load.

BACKGROUND OF THE INVENTION

A typical motor vehicle comprises a vehicle body mounted upon tour wheels. Generally, the motor vehicle includes a suspension system providing for suspension between the vehicle body and the wheels, to allow for a smooth ride. Such a system may, for example, include leaf springs or other conventional arrangements.

In normal use of a motorized vehicle, the load and distribution of the load carried by the suspension system may vary. For example, a trailer or the like might be attached to the rear of the vehicle, causing an increase in weight load carried by a rear portion of the vehicle suspension system. Further, loading of the vehicle body, upon the springs, may be varied by varying numbers and/or distributions of passengers within the vehicle, and the carrying of cargo by the vehicle.

Under varying loads, the attitude of the vehicle body relative to the wheels may be changed. For example, if the rear trunk compartment of a motorized vehicle is heavily loaded with luggage or the like, the rear portion of the body may sink with the front portion of the body raising somewhat, with respect to the wheels and the ground. A similar effect may be encountered if a trailer is attached to the rear of the vehicle.

Generally, conventional motor vehicles are manufactured such that varying attitudes of the vehicle body, relative to the wheels, due to load variations, do not present a substantial problem to vehicle performance. That is, generally, arrangements have been developed permitting adequate compensation to the varying vehicle body position, to permit appropriate vehicle control.

In at least one area, however, problems have developed. This generally relates to vehicle headlight alignment.

Most motorized vehicles include a set of headlights. These headlights are adjusted, generally, to be aimed at a portion of the road surface a selected distance in front of the vehicle, to provide appropriate illumination for driving at night. Often high beam and low beam systems are utilized, to provide both near and distance viewing.

Two important parameters control and determine appropriate aiming of the headlights. The first is that the headlights, particularly low beam headlights, should be aimed sufficiently downwardly at the road surface, so that drivers of oncoming vehicles will not be temporarily blinded by the vehicle lights. Secondly, the headlights must be oriented in an appropriate position to provide adequate illumination of the road surface, for safe vehicle operation. This generally requires aiming at or near the road surface a selected distance in front of the vehicle.

The headlight systems are mounted within the vehicle body, which floats upon the suspension system. Thus, as the vehicle body orientation or attitude shifts relative to varying loads, headlight positioning also shifts. As a result, proper headlight adjustment may be disrupted when cargo or passengers are put in a vehicle body, or when a trailer is attached to the vehicle.

For example, consider an empty vehicle with its headlights appropriately adjusted at a selected position on a road surface. Should a heavy load be placed in a rear portion of the vehicle body, the rear portion will sink, and the front portion of the vehicle body will be raised somewhat. The result of this is that the headlights will be aimed even further down the road surface, possibly providing for inappropriate and unsafe illumination of the road surface, and also possibly interfering with the vision of operators of oncoming cars.

The problem, then, is generally created by the suspension system, which permits the vehicle body to reorient in response to load. What has been needed is a system by which headlight alignment can be adjusted to compensate for such reorientation.

Numerous systems have been developed and might be suggested, for headlight alignment. However they have not been completely desirable for a number of reasons. For example, if headlight adjustment were made strictly with response to the horizontal, through some sort of leveling means, then proper headlight alignment would generally only be achieved if the adjustment was made while the vehicle was resting on a flat, i.e., not inclined, surface.

It would also be preferred that the system operate through the utilization of relatively inexpensive mechanical and electrical components so that it can be included or added as a feature in even relatively inexpensive vehicles, and will operate under a variety of climactic and weather conditions.

OBJECTS OF THE INVENTION

What has been needed has been an efficient and economic leveling system providing for control and readjustment of the headlight alignment of motorized vehicles. It is an object of the present invention to provide such a system. Other objects and advantages of the present invention will become apparent from the following description, taken in connection with the accompanying drawings, wherein are set forth by way of illustration and example certain embodiments of the present invention.

SUMMARY OF THE INVENTION

The present invention relies upon the interaction of three basic component systems. By the first component, the level of the road surface on which the vehicle is standing is determined. By the second component the alignment of the vehicle headlights is detected. By the third component, relative level between headlight aim and ground level is determined by comparison, and adjustment in the vehicle headlight alignment is made, to yield a preferred relationship with respect to the road surface. Detection, comparison and/or adjustment can be made by automatic or manual systems, or a mixture of both.

The first component, or means by which road level determination is made, generally comprises a level means in association with the vehicle wheels or axle(s). In particular, the front to rear level of the wheels or axle(s) is measured. This generally will reflect the angle of the road surface, as will be understood by the detailed descriptions.

According to the present invention, two means are disclosed for determining the front to rear level. Via the first and preferred method, an elongate extension is placed in communication with the vehicle rear axle, and a wheel mount or axle on the front of the vehicle. This elongate member is selectively oriented, during mounting, to be parallel with the road surface. A conventional detector, with sensing means, in association with the elongate extension can be used to detect the angle of the road surface. Preterably, the angle information is transmitted to an indicator or display, inside the vehicle body, informing the vehicle operator of the road inclination.

The angle of the vehicle body itself, or the headlights mounted thereon, is determined by a second level means mounted in the vehicle body. This may include, for example, a level, such as a conventional bubble level with detector, mounted appropriately within the vehicle body to gauge front to rear level. Preferably, the level means is in direct communication with, or directly responsive to, headlight alignment so that relative movement in the headlight alignment is directly detected.

It will be understood that a determination of the absolute level of headlight alignment is not critical. Rather, it is only necessary to measure relative alignment, with respect to the ground plane or a proper set. From this information, headlight adjustment can be made to bring the headlights into appropriate alignment with the ground plane, regardless of whether the vehicle is standing on a flat surface, a downward slope, or an upward slope at the time of adjustment.

As indicated previously, the third major component generally relates to adjustment in the headlight system. In general, level information regarding the ground inclination and the headlight alignment are transmitted to a comparison means or mechanism, preferably a display means in the passenger compartment positioned on the instrument panel for viewing by the vehicle operator. Adjustment and headlight alignment is accomplished through a mechanical mechanism for moving the headlights about pivot axes. The adjustment is made until an appropriate relationship between headlight alignment and the measured ground inclination or declination is achieved.

The drawings constitute a part of this specification and include exemplary embodiments of the present invention, while illustrating various objects and features thereof. It will be understood that in some instances relative scale between illustrated parts is shown exaggerated, to facilitate an understanding of the invention.

BRIEF DESCRIPTION OF THE DRAWINGS

FIG. 1 is a perspective view of an automotive vehicle including a headlight leveling system according to the present invention illustrated schematically; phantom lines being utilized to indicate selected internal portions.

FIG. 2 is a schematic representation of a headlight leveling system according to the present invention.

FIG. 3 is an enlarged, fragmentary, side elevational view of a portion of the system illustrated in FIG. 1.

DETAILED DESCRIPTION OF THE PREFERRED EMBODIMENTS

Figure 4:
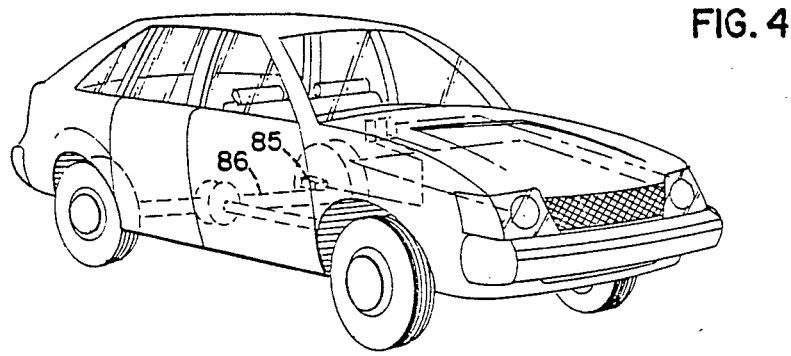
FIG. 4 is a perspective view analogous to FIG. 1, but showing an alternate embodiment.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

The reference numeral 1, FIG. 1, generally designates an automotive vehicle including a headlight alignment or adjustment mechanism or system according to the present invention. The vehicle 1 depicted represents a conventional passenger car. It will be understood that the present invention may be utilized in association with a variety of vehicles, including a variety of automobiles, trucks and busses.

Referring to FIG. 1, vehicle 1 includes a body 5 mounted by means of a suspension system, not shown, upon wheels 7. The wheels 7 comprise front wheels 8 and rear wheels 9.

The vehicle 1 includes a front headlight system 11. For vehicle 1 the headlight system 11 is shown including a pair of headlights 12 which may be of conventional design, except as indicated herein.

The headlights 12 are mounted so as to be adjustable for pivoting about a horiztonal axis extending substantially perpendicularly or laterally to the car body 5. That is, generally the headlights 12 are pivotable about an axis extending along the direction of line 15, FIG. 1. Preferably, the vehicle 1 includes means by which headlights 12 can be retained in a selected position of rotation relative to the axis represented by line 15. For the preferred embodiment both headlights 12 are pivotable about the same asis 15, although such is not required.

As a result of the hinged or pivot mounting, the headlights 12 are adjustable with respect to the horizontal plane. Thus, they may be adjusted to aim more, or less, downwardly toward the road surface.

Preferred parameters for the aiming of headlight beams are well-known in the art, and are often set by government regulations. Generally, these include a definition of the downward angle at which the headlights are to be aimed when the vehicle is standing upon a level surface. In this manner it is ensured that the headlights are appropriately aimed downwardly at the road surface, in front of the vehicle, where proper road illumination will occur and so that the drivers of oncoming vehicles will not be temporarily blinded by the headlights.

It will be understood that under certain conditions the attitude of the vehicle body 5 may vary relative to the wheels 7. In particular, should the vehicle body 5 be loaded asymmetrically with respect to the suspension system and the wheels 7, the vehicle body 5, as it floats upon the suspension system, will adjust in position. For example, a heavy loading of a rear portion of the vehicle 1 will casue the front portion of the vehicle 1 to raise somewhat. The result of this is that the headlights 12 will also raise in aim, along with the vehicle body 5. Such movement results in an improper aiming of the headlights 12.

The present invention relates to means for determination of a proper headlight aim or alignment, and means for compensation in headlight position to achieve the appropriate alignment. The invention will be understood by reference to FIG. 2.

FIG. 2 is a schematic representation illustrating the pair of headlights 20 and 21. The headlights 20 and 21 are illustrated as mounted in frame members or mounting plates 23 and 24, respectively, for pivoting about a horizontal axis 15 defined by hinges 27 and 28. It will be understood that a variety of pivot/mount arrangements may be utilized in association with the present invention.

Reference numeral 30, FIG. 2, generally designates a headlight level detection mechanism associated with headlight 20 and plate 24. A variety of mechanisms may be utilized. Generally the mechanism comprises a level such as a conventional bubble level and detector, cooperatively utilized to detect orientation, relative to the horizontal, of a portion of the headlight 20/frame member 23 assembly. It will be understood that by mechanism 30 the orientation of the headlight 20 and frame member 24 with respect to hinge 27, and the horizontal, can be readily detected.

Reference numeral 31 illustrates a display which may be positioned inside of the vehicle 1, for example on the vehicle dashboard, to illustrate to a passenger in the associated motor vehicle 1, preferably the driver, the relative level detected by detector 30. Communication between level mechanism 30 and the display 31 is provided by represented cable 32.

The display 31 depicted comprises an indicator needle 33 which rotates with respect to a calibrated screen 34, to display relative angle of headlight alignment. Knob 35 may be utilized for calibration purposes, in association with a conventional mechanism, not shown, for initial adjustment or setting of needle 33 position.

It will be understood that a variety of displays 31 and level mechanisms 30 may be utilized in association with the principles of the present invention. Generally, what is required is a moderately accurate method of detecting relative headlight level or alignment. It is noted that in FIG. 2 only one level mechanism 30 and display 31 are depicted, in association with only one of the headlights 20. Generally, it will be preferred that the orientation of the headlights relative to one another be fixed, so that the level of only one of the two headlights needs to be monitored, for accurate control of overall headlight alignment.

According to the principles of the invention, headlight alignment or level is compared by a level comparison mechanism preferably comprising use of display 31, to the ground level. If the system is initially calibrated for proper alignment, then all that is necessary is a determination of whether under any circumstances headlight aiming is too high or too low, relative to the ground. If aim is too high or too low, an appropriate adjustment in headlight location is made. It will be understood that the level comparison may be made by automatic means, not shown.

Means for determining ground level are discussed below. First, the means for adjusting headlight angle or aim, i.e., the headlight level adjustment mechanism, is described.

Referring to FIG. 2, each of the headlight/frame combinations (headlight 20/frame 23 and headlight 21/frame 24) includes a mechanism 37 associated therewith by which rotation about an associated horizontal hinge, 27 or 28, can be adjusted and controlled. It will understood that a variety of systems may be utilized to adjust headlight orientation. For the system represented by FIG. 2, a control or dial 40 is mounted in the vehicle interior, for example, on the dashboard. Control 40, when rotated, rotates associated gear 41. Main gear 41 drives a pair of independent gears 42 and 43, one each of which is associated with one each of the headlights 20 and 21, respectively.

Lines 45 and 46 each represent a cable, of a conventional type, having an internal member which is rotated upon rotation of gears 42 and 43. In particular, gear 42 rotates an internal cable member of cable 45 and gear 43 rotates an internal cable member of cable 46.

Cable 45 is shown operating worm gear 50 which by means of a conventional gearing system in mechanism 37 adjusts pivoting of headlight 20 about hinge 27. In parallel, worm gear 51 pivots headlight 21 about hinge 28.

As a result of the above type of arrangement, turning of a single control 40 simultaneously and synchronously adjusts both headlights 20 and 21. Preferably, gearing is selected to facilitate ease of adjustment and to maintain a proper relative adjustment of the two headlights 20 and 21. It is not required that the headlights be parallel to one another, but rather that all adjustments be made substantially the same for each. That is, for example, if headlight 20 is angled downwardly about three degrees by operation of the adjustment mechanism 37, headlight 21 should be similarly adjusted.

In the schematic representation of FIG. 2, reference numeral 60 generally represents the means by which the ground plane is located, for comparison to the headlight level reflected on display 31, i.e., reference numeral 60 designates the ground level detection mechanism. Mechanism 60 may utilize a variety of arrangements. Generally what is required is that by means of mechanism 60 the ground plane, i.e., the inclination or declination of the ground surface upon which the vehicle rests, can be determined or at least approximated. This information is relayed by cable 61 to display 62. Display 62 is preferably mounted substantially adjacent display 31, in the vehicle interior, facilitating comparison.

A variety of arrangements may be utilized for display 62. For the embodiment shown, the display 62 comprises an indicator needle 64 which rotates in response to varying angles measured by mechanism 60, to indicate the angle or relative angle on screen 65. Knob 66 is for initial calibration, or setting of the needle 64, by means, not shown, which may be of a conventional nature. A particular preferred level mechanism 60 will be discussed in further detail below. First the general operation of the assembly is presented.

In operation, the arrangement is prepared so that the ground plane or an estimate of the ground plane is indicated on display 62. In the arrangement shown in FIG. 2, the display illustrates a substantially horizontal ground plane. The needle 64 may be read, relative to the screen 65, to determine the ground plane.

Headlight aiming, with respect to the horizontal, is controlled by knob 40. Knob 40 is selectively rotated by the operator until the headlights 20 and 21 are positioned appropriately for the ground plane illustrated by display 62. Generally, the system may be calibrated such that all that is required is a rotation of knob 40 until display needle 33, for headlight location, reads at an angle identical to needle 64. Thus, as illustrated in FIG. 2, knob 40 has been adjusted until needle 33 reads horizontal. This does not necessarily mean that the headlights 20 and 21 are aimed in the horizontal plane, i.e., parallel to the ground. Rather, preferably, display or gauge 31 has simply been calibrated relative to display or gauge 62 such that a 0° or level reading is reflected by needle 33 whenever the headlights 20 and 21 are properly positioned for a vehicle resting upon a horizontal surface.

From the above description it will be understood that should the vehicle be loaded such that the vehicle body 5 changes orientation upon the wheels 7, proper headlight adjustment can readily be made. In particular, regardless of the orientation of the vehicle body 5, ground level detection mechanism 60 will generally indicate the ground plane. Thus, all that would be required in response to the vehicle body 5 reorientation upon the suspension system is that knob 40 be adjusted to bring headlights 20 and 21 back into proper orientation.

A variety of mechanisms may be utilized to provide ground level determination, i.e., the mechanism generally represented by reference numeral 60, FIG. 2. A preferred mechanism will be understood by reference to FIGS. 1 and 3. In FIG. 1, a horizontal bar or bar member 69 is shown mounted upon the vehicle 1 for extension between front and rear wheels or wheel assemblies 8 and 9, respectively. The level bar 64 is preferably adjusted so that it is level, i.e., will be parallel to the ground at all times. It will be understood that bar 64 need not be level if its angle is maintained contant, since calibration means can be used to compensate for a deviation from level. Bar 69 includes a level detector 70, as a ground level detection mechanism 60, thereon used to determine the level of the bar 69, and thus the ground. Level detector 70 may be of a variety of designs, including conventional ones utilizing a bubble level and detector system in communication with a display or indicator, such as indicator 62, FIG. 2.

It will be understood that since the bar 69 is mounted upon the wheel and axle system of vehicle 1, it is not subject to substantial movement from repositioning of the vehicle body 5 upon the suspension system. Preferably, bar 69 communicates directly between axles or axle means of associated wheels.

Referring to FIG. 3, bar 69 is depicted extending between axle members associated with front wheel 8 and rear wheel 9. In particular, bar 69 extends between front axle member 75 and rear axle member 76. Front mount mechanism 79 and rear mount mechanism 80 are used to provide the linkage. Preferably a universal linkage is utilized for each position, to accomodate twisting of the tires or possible rotation of the axle assemblies, during vehicle use. It will be understood that the linkages 79 and 80 may include adjustment means therein, whereby bar 69 can be adjusted to a preferred, typically level, orientation prior to use. From that point on, level detector 70 can be utilized to detect and display the level of the bar, and thus the level of the ground. Linkages 79 and 80 may be prepared from conventional couplings, details not shown.

An alternate mechanism for determining, or at least approximating, ground level is illustrated in FIG. 4. In particular, reference numeral 85 designates a level mechanism mounted directly in association with rear axle assembly 86, i.e., a portion of the vehicle's axle and wheel system which is not substantially subject to movement from varying loads placed on the suspension system. It will be understood that the detector 85 may be mounted on either a front or a rear axle assembly. Preferably, level mechanism 85 is mounted, or adjusted, to detect the level of the axle assembly 86, front to rear, and thus the level of the ground. In this manner the level of the ground plane can be approximated. It will be understood that precise level determination cannot always be made with such a system, as rear axle assembly 86 may tend to rotate or twist somewhat as loads are placed upon the vehicle body 88, and thus the associated spring system. For example, should the vehicle body 88 be mounted upon the rear axle 86 by means of leaf springs, or by a conventional leaf spring arrangement, a load to the rear of the rear axle 86 would tend to compress the rearwardly extending leaf spring, not shown, relative to the frontwardly extending leaf spring, also not shown. This may have a tendency to twist or rotate the rear axle assembly 86 somewhat, moving level 85 slightly out of level alignment, regardless of the ground plane. However, it is expected that in normal vehicle use any twisting movement in the rear axle 86 from such forces will be relatively small and thus the ground plane level can be readily approximated. Further, if necessary, calibration knob 66, FIG. 2, on the associated level display 62, can be utilized to compensate for any such twisting, for example after a direct comparison of the level indicated on display 62, after loading is made, with a measurement taken before loading.

A variety of other means may be utilized to determine the level of the vehicle body relative to the ground. For example, means may be associated with the front and the rear of the vehicle, to measure relative distance from the ground or relative distance of extension or compression of portions of the suspension system. If appropriately calibrated, the mechanism may be utilized to indicate a level alignment, or an alignment out of level. This can be transferred to the reflection of the ground level on a display screen, for comparison with the level of the headlights.

Figure 5:
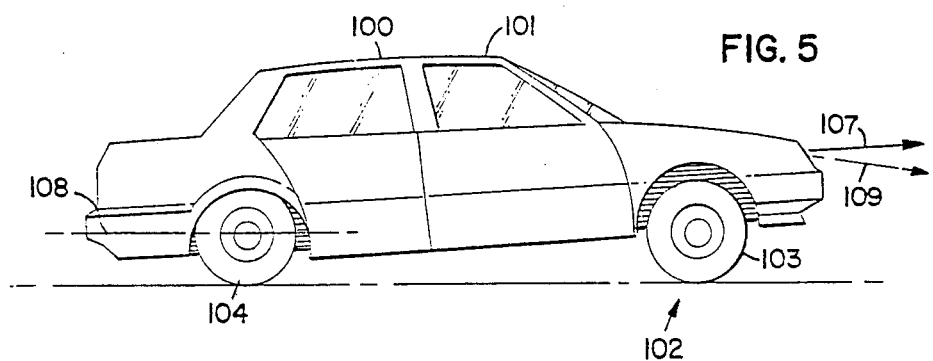
FIG. 5 is a schematic representation of an automotive vehicle illustrated as if loaded so that a front end of the vehicle rides high, causing improper alignment of headlights.

FIG. 5 is a schematic representation of a vehicle which illustrates the utility of the present invention. In FIG. 5, the motor vehicle is represented by numeral 100. The vehicle includes a body 101 and wheel system 102, comprising front wheels 103 and rear wheels 104. The vehicle 100 is illustrated as if loaded in a rear portion thereof with cargo, pressing a rear portion of the vehicle body 101 down upon the suspension system, and raising the front portion of the vehicle body up. Thus, the headlights are extended generally upwardly, as indicated by arrow 107. The ground plane, on the other hand, is generally represented by line 108. It is readily seen that an adjustment in the headlight alignment is necessary, to decrease the upward angle of arrow 107, preferably bringing same to an appropriate direction of extension toward the road surface, for example, as by indicated by phantom line arrow 109. This may be accomplished through utilization of the headlight leveling system according to the present invention. An advantage of the present invention is that the ground plane need not be level for the system to be operable, since adjustment is made by comparison of headlight plane to ground plane.

It is to be understood that while certain embodiments of the present invention have been illustrated and described, the invention is not to be limited to the specific forms or arrangement of parts herein described and shown.

What is claimed is:

1. A vehicle headlight adjustment mechanism mounted in a vehicle, said adjustment mechanism comprising:
   (a) a ground level detection mechanism constructed and arranged to measure a level of a ground plane upon which the vehicle is positioned;
   (b) a headlight level detection mechanism constructed and arranged for measuring an orientation of headlight aim of the vehicle, relative to the vehicle and the horizontal;
   (c) a level comparison mechanism constructed and arranged for comparing a level detected by said ground level detection mechanism to said relative level detected by said headlight level detection mechanism; and
   (d) a headlight aim adjustment mechanism constructed and arranged for selective adjustment of headlight aim.

2. The vehicle headlight adjustment mechanism according to claim 1 wherein:
   (a) said ground level detection mechanism includes a level bar extending between front and rear wheel assemblies of the vehicle and oriented to be substantially level; and
   (b) said ground level detection mechanism further includes a level detector mounted on said level bar.

3. A vehicle headlight adjustment mechanism mounted in a vehicle, said adjustment mechanism comprising:
   (a) a ground level detection mechanism constructed and arranged to measure a level of a ground plane upon which the vehicle is positioned;
   (b) a headlight level detection mechanism constructed and arranged for measuring an orientation of headlight aim of the vehicle, relative to the vehicle and the horizontal;
   (c) a ground level display mechanism constructed and arranged to display a ground level, detected by said ground level detection mechanism, to a person inside the vehicle;
   (d) a headlight level display mechanism constructed and arranged to display a relative headlight aim, detected by said headlight level detection mechanism, to a person inside the vehicle; and
   (e) a headlight aim adjustment mechanism constructed and arranged for selective adjustment of headlight aim with respect to a horizontal plane.

4. The vehicle headlight adjustment mechanism according to claim 3 wherein:
   (a) said ground level detection mechanism includes a level bar extending between front and rear wheel assemblies of the vehicle and oriented to be substantially level; and
   (b) said ground level detection mechanism further includes a level detector mounted on said level bar.

5. The vehicle headlight adjustment mechanism according to claim 4 wherein:
   (a) said ground level display mechanism includes a meter display having a pivotable indicator needle; and
   (b) said headlight level display mechanism includes a meter display having a pivotable indicator needle.

6. The vehicle headlight adjustment mechanism according to claim 3 wherein:
   (a) said ground level display mechanism includes a meter display having a pivotable indicator needle; and
   (b) said headlight level display mechanism includes a meter display having a pivotable indicator needle.

7. The vehicle headlight adjustment mechanism according to claim 3 wherein:
   (a) the vehicle includes first and second headlights respectively mounted in first and second pivotable mounting plates; said mounting plates each being mounted for pivoting about a substantially horizontal axis which extends generally laterally to the vehicle; and
   (b) said headlight aim adjustment mechanism includes separate pivot mechanisms for pivoting each of said mounting plates, said pivot mechanisms being simultaneously and synchronously actuable by operation of a single control.

* * * * *